(12) United States Patent
DeGironemo

(10) Patent No.: US 7,861,927 B2
(45) Date of Patent: Jan. 4, 2011

(54) AUTOMATED RETAIL KIOSK WITH CHANGEABLE PRESENTATION FORMATS

(76) Inventor: William A. DeGironemo, 1321 Tower Rd., Shaumburg, IL (US) 60173

( * ) Notice: Subject to any disclaimer, the term of this patent is extended or adjusted under 35 U.S.C. 154(b) by 667 days.

(21) Appl. No.: 11/899,063

(22) Filed: Sep. 4, 2007

(65) Prior Publication Data

US 2009/0057394 A1    Mar. 5, 2009

(51) Int. Cl.
*G06F 7/08* (2006.01)
*G06K 15/00* (2006.01)
(52) U.S. Cl. .................. 235/381; 235/383; 235/375
(58) Field of Classification Search ............ 235/381, 235/375, 383, 492, 380; 455/406, 422.1, 455/405, 415, 409, 407
See application file for complete search history.

(56) References Cited

U.S. PATENT DOCUMENTS

| | | | | |
|---|---|---|---|---|
| 4,951,308 | A | * | 8/1990 | Bishop et al. ............. 379/91.01 |
| 5,446,613 | A | * | 8/1995 | Rottmayer ................... 360/319 |
| D437,891 | S | * | 2/2001 | Gonsiorowski et al. ...... D20/10 |
| 6,526,130 | B1 | | 2/2003 | Paschini |
| 6,595,342 | B1 | | 7/2003 | Maritzen et al. |
| 6,609,102 | B2 | | 8/2003 | Kolls |
| 6,695,166 | B2 | * | 2/2004 | Long ............................ 221/14 |
| 6,711,464 | B1 | | 3/2004 | Yap et al. |
| 7,046,239 | B2 | * | 5/2006 | Asai et al. .................... 345/211 |
| 2001/0000505 | A1 | * | 4/2001 | Segal et al. ................. 455/405 |
| 2002/0161598 | A1 | * | 10/2002 | Kim .............................. 705/1 |

OTHER PUBLICATIONS

PCT International Search Report Nov. 21, 2008.
PCT International Preliminary Report on Patentability Mar. 18, 2010.

\* cited by examiner

*Primary Examiner*—Thien M Le
(74) *Attorney, Agent, or Firm*—Clifford Kraft

(57) ABSTRACT

An automated retail kiosk or vending machine that can vend working cellular handsets and that uses changeable presentation formats. The kiosk is generally an automated retail kiosk that can deliver primarily prepaid wireless products and services such as prepaid cellular handsets, prepaid cellular and long distance calling plans and E-pins, accessories like ear buds, phone holsters, SIM backup devices, cables and the like. In addition the kiosk or vending device can optionally provide a complete array of banking services including check cashing, prepaid debit cards, transfer of funds from debit card to debit card and many other services. An advertisement screen can play continuous or targeted advertising. The kiosk or vending device can change how it looks by accepting changeable front plates or housings, and it can communicate wirelessly over a network and be managed from a central location.

10 Claims, 5 Drawing Sheets

US 7,861,927 B2

AUTOMATED RETAIL KIOSK WITH CHANGEABLE PRESENTATION FORMATS

BACKGROUND

1. Field of the Invention

The present invention relates generally to the field of retail sales by kiosk and more particularly to an automated retail kiosk vending machine that can vend cellular telephones, E-pins and accessories as well as provides an advertising screen and banking services and that has changeable presentation formats (external appearances).

2. Description of the Prior Art

Vending machines that vend various items are known in the art such as cola machines, candy machines and the like. In addition, there are kiosks or vending machines that vend telephone card minutes such as that described by Sorenson et al. in U.S. published application number 2006/0108414 and U.S. Pat. No. 7,014,108. There are also numerous kiosks that provide banking and ATM services. Generally these kiosks are not designed to be attractive or be able to change their presentation format, but rather are either rectangular boxes or are simply computer terminals and video monitors.

Kiosks can also be used to originate subscriber accounts or add minutes to existing accounts. An example of this is taught by Gary in U.S. published application Ser. No. 2007/0124164. As with the previous examples, Gary does not teach making the looks of the kiosk relate to vended products or to be able to change how the kiosk looks. None of these examples allow the kiosk to vend a cellular telephone.

It would be advantageous to have a kiosk or vending machine that has exchangeable presentation formats as to how it looks (for example, rectangular or shaped like a cellular telephone, etc.) in order to relate to what it vends and therefore attract customers, where the kiosk vends actual working cellular telephones along with accessories and calling plans or E-pins as well as displaying a large advertising screen. This kiosk could additionally provide a variety of standard banking services such as check cashing, cash withdrawal, wire transfer, bill paying and any other banking services such as ATM.

SUMMARY OF THE INVENTION

The present invention relates to a kiosk or vending machine that can vend working cellular handsets and accessories, interactive electronic telephone cards, as well as optionally provide banking services, and that can also present different appearances or formats. The kiosk is generally an automated retail vending machine that delivers primarily wireless products, accessories and services; however, it can also deliver any conventional product or service. The kiosk normally offers an entire suite of products and services like prepaid cellular handsets, prepaid cellular and long distance calling plans, E-pins and accessories like ear buds, phone holsters, SIM backup memory devices, cables, Bluetooth headsets and the like. In addition the kiosk can optionally provide a complete array of banking services including check cashing, prepaid debit cards, transfer of funds from debit card to debit card and other services. When services are prepaid, there is no need for credit checks, contracts or deposits. The normally accepted forms of payment can be cash, debit card, credit card and certain checks. Security can be provided by scanning driver's licenses, fingerprints and photographs. The kiosk of the present invention normally communicates wirelessly over a network and can be managed from a central location. Multiple kiosks can thus be conveniently managed remotely.

DESCRIPTION OF THE FIGURES

Certain embodiments of the present invention are shown in the following figures.

Several drawings and illustrations have been presented to aid in understanding the present invention. The scope of the present invention is not limited to what is shown in the figures.

DESCRIPTION OF THE INVENTION

The present invention relates to kiosks or vending devices that vend actual working cellular telephones as well as plans, minutes, E-pins and accessories. These kiosks can also have interchangeable presentation formats by which the same machine can be made to look different by changing face plates or other parts of the kiosk.

Figure 1:
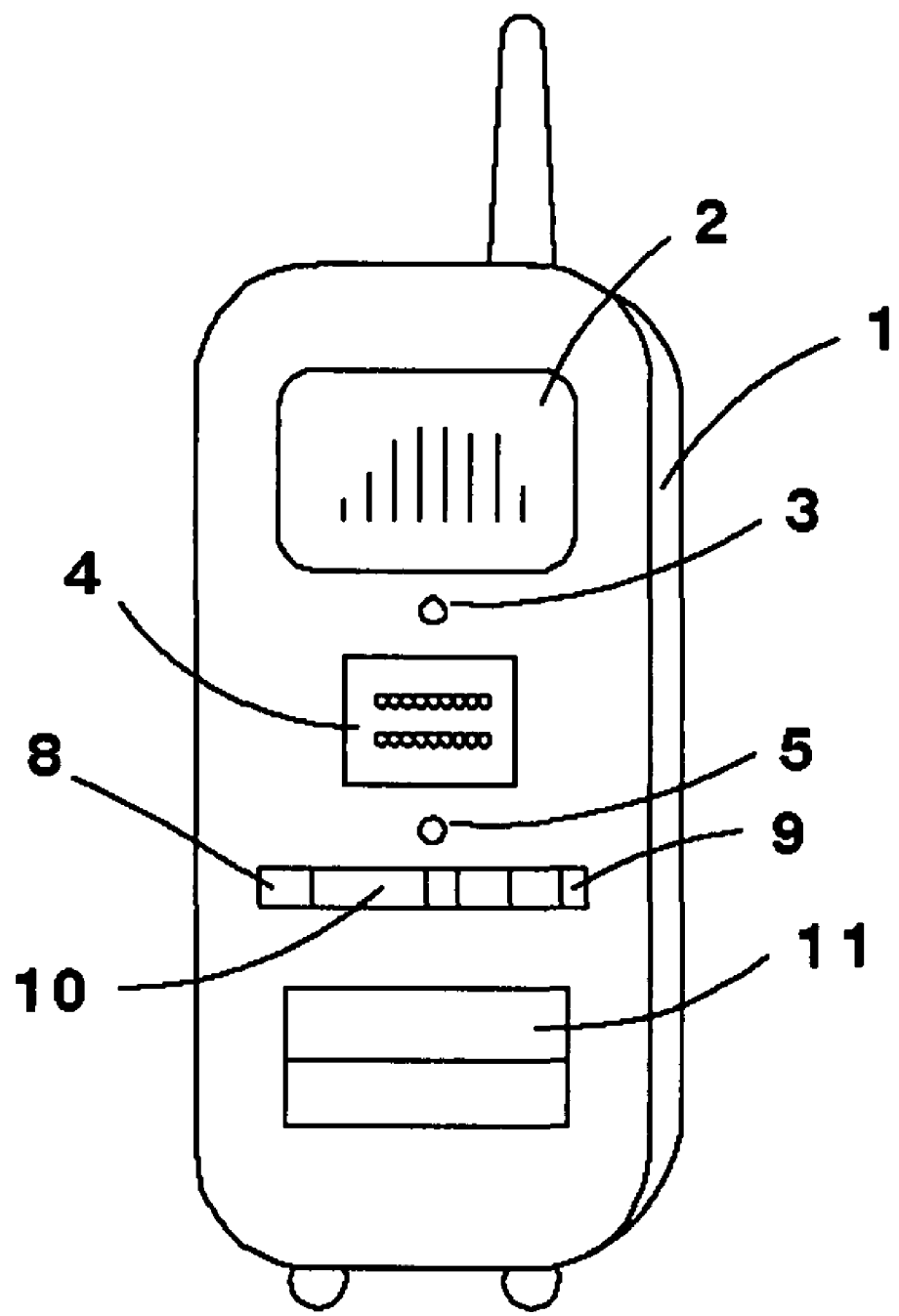
FIG. 1 shows a perspective view of an embodiment of the present invention.

FIG. 1 shows an embodiment of the present invention with a format 1 that looks like a particular type of cellular telephone. A primary feature is an advertising screen 2 where continuous or targeted advertisements normally run. A typical kiosk can accept cash, have a touch screen 4 for entering private information and have a dispenser for vending actual telephones and accessories. An optional camera 3, fingerprint reader 5, check imaging device 8, bill acceptor 9 and keyboard 10 can be seen. The kiosk contains a vending area 11 where handsets and accessories can be vended.

Figure 2A:
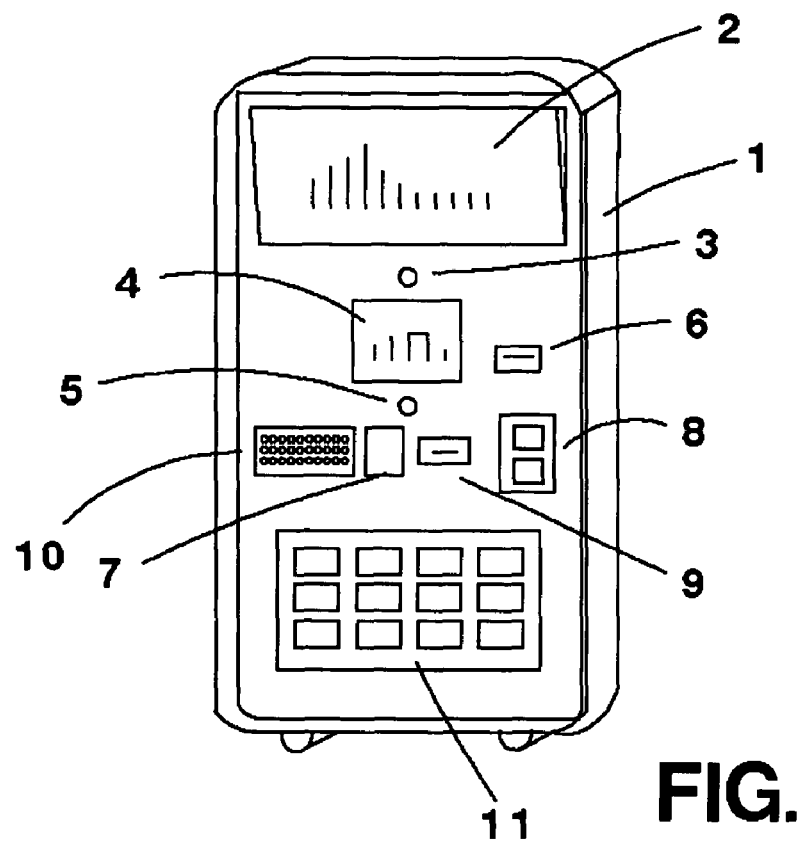
FIG. 2A shows a front view of an embodiment with a different presentation format.
Figure 2B:
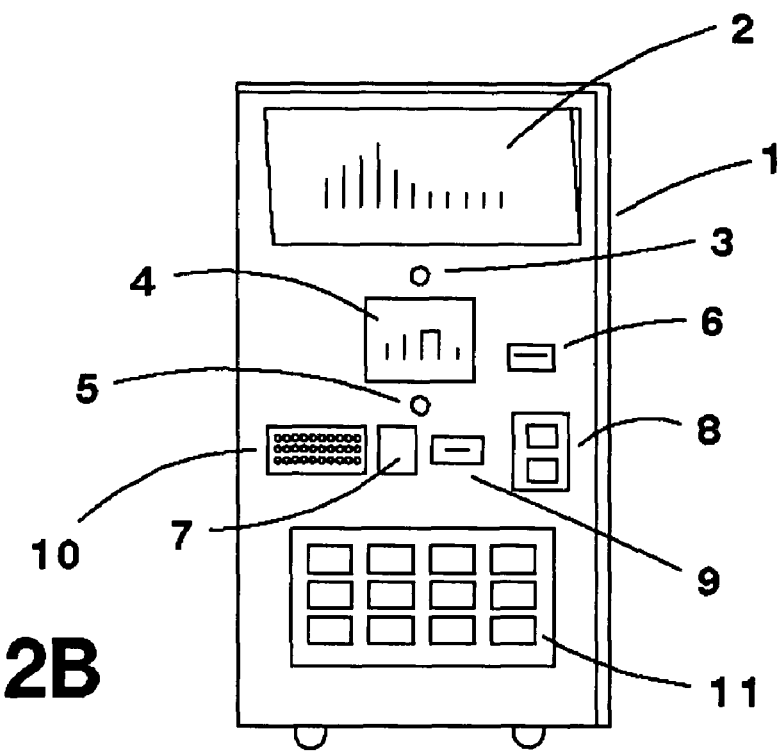
FIG. 2B shows a kiosk with a different presentation format.

Turning to FIG. 2A, the kiosk can be seen with a different presentation format 1 that looks like a different type of cellular telephone. Again, the kiosk includes an advertising screen 2, an entry screen 4 such as a touch screen, a keyboard 10, a camera 3, a fingerprint reader 5, a card dispenser 6, a check imaging device 8, a combination or separate receipt printer 7, a bill acceptor 9 and a telephone vending port 11. FIG. 2B shows a different presentation format for the kiosk of FIG. 2A. The embodiment shown in FIGS. 2A-2B can optionally add or omit items from the above list. For example, if no banking services are to be provided, the check imaging device may not be needed. Particular embodiments of the present invention can include various combinations of the above-named features.

The kiosk or vending device of the present invention can act as a totally stand-alone unit to vend actual working cellular telephones, either as paid-up or in conjunction with calling plans. GSM telephones can exit the machine with a programmed SIM card that allows them to work immediately. CDMA telephones normally need to be programmed by making a telephone call to a particular number after vending. This can be done by the consumer immediately after purchase. It is within the scope of the present invention to optionally perform this service for a CDMA telephone in the kiosk during the process of vending.

The kiosk or vending device of the present invention can also be used to vend wireless accessories such as SIM reader devices, earpieces, cables, holsters, Bluetooth headsets and any other telephone accessory. Some embodiments of the invention can also vend unrelated items that might be of interest to the consumer such as prepackaged drugs and banking and money collection services like paying of traffic or parking fines, bill payment and any other vending or fund collection service.

In particular the automated retail kiosk of the present invention can offer an entire category of prepaid products and services in addition to prepaid handsets that include prepaid cellular and long distance calling plans, E-pins and optional financial services like bill payment, prepaid credit cards and check cashing. Successful check cashing can cause the payout to be in the form of a prepaid credit card. As previously stated, the kiosk of the present invention can vend prepaid GSM or CDMA handsets, bundled accessories like ear buds, car chargers, leather holsters, Bluetooth accessories and SIM card backup devices. In addition, the device can generally vend prepaid mobile and long distance service such as $10, $20, $30, $50 and $100 E-pins as well as any other denomination. In addition it can optionally provide cash to a new debit card, debit card to debit card transfer, bill paying such as utility bills, and check to debit card transfer.

In a particular embodiment of the invention, a user-friendly touch screen display can guide the user through the purchasing process. The consumer can choose from a variety of choices including wireless handsets, airtime services, long distance, roaming, text messaging, voice mail, caller ID, call forwarding exactly like postpaid services except that there would be no contract, no credit check and no deposit. It should be noted that while the kiosk of the present invention may primarily be used to vend prepaid items and features, it could very well be used to also vend standard plans and features. Any type of vending is within the scope of the present invention.

An important feature of the present invention is advertising. This feature presents itself in two ways: first the way the machine looks (the presentation format), and second through an advertising screen that can run continuous paid advertisements such as loop-advertisements. The first feature allows the machine to have changeable front plates or other parts to tailor its look and feel. The same kiosk could be made to look like a cellular telephone, a bank ATM, a candy machine, drug store or any other presentation format. A particular service provider's name can also appear on the exterior of the changeable plate. In particular, the kiosk of the present invention can be equipped with a front-loading vending apparatus. A remote station can send advertisements to a large number of kiosks or vending machines on a network. Each machine can run the same advertisement, or different machines could be sent different advertisements.

Figure 3:
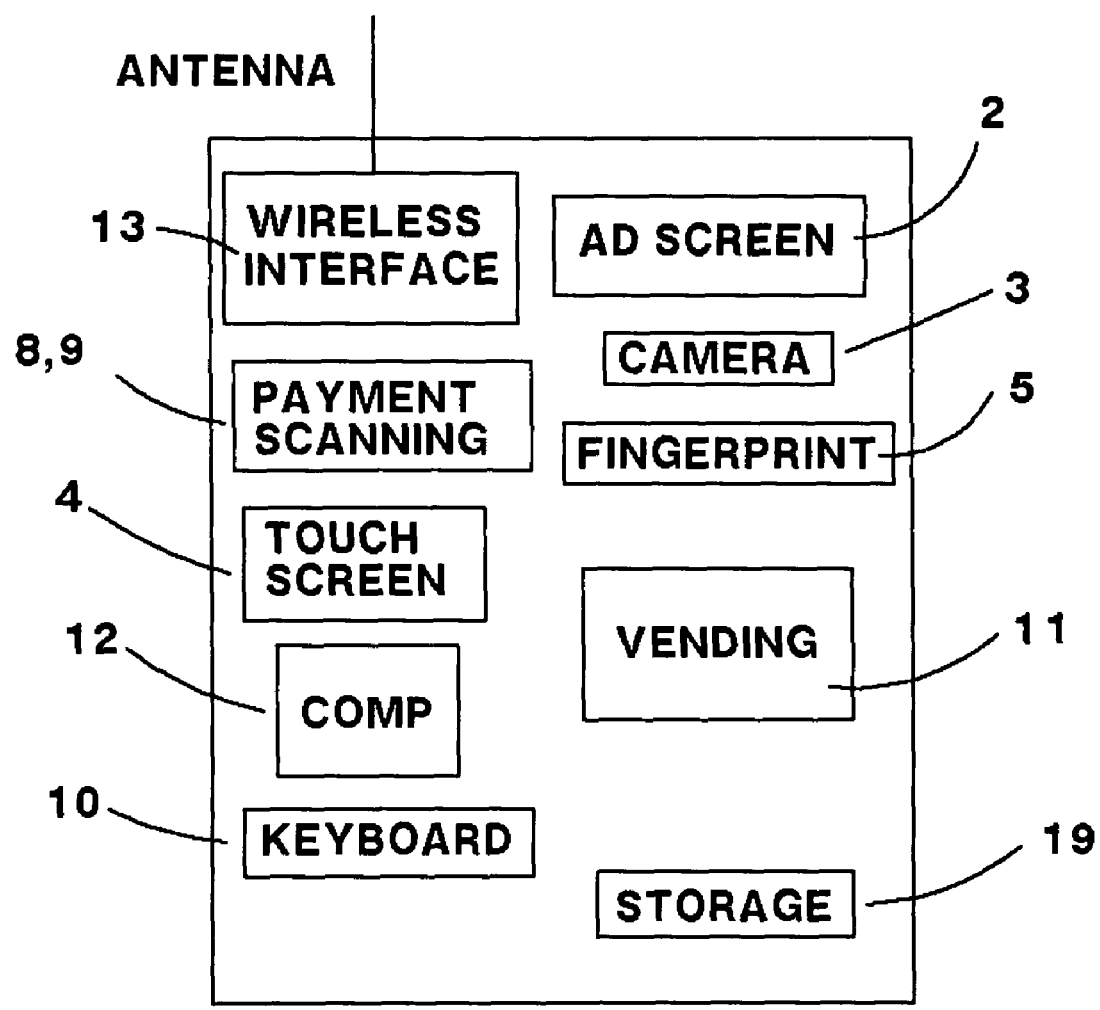
FIG. 3 shows schematically some of the internal parts of the embodiment of FIG. 1 or 2A-2B.

FIG. 3 shows a diagram of possible internal hardware features that could be found in a typical kiosk of the present invention. A computer 12 controls the device and communicates electrically with a wireless communications interface 13 that allows the kiosk to communicate wirelessly with remote stations. Wireless communication can be into a local area network or by cellular telephone call or by any other wireless technique. A particular form of communication is for the kiosk to wirelessly communicate with a gateway into the internet, and then use the internet to communicate with an ultimate destination. A backup land line can optionally be used in case of difficulty in completing wireless communication.

The kiosk or vending machine shown in FIG. 3 also can contain an advertisement screen 2, a touch screen 4, a fingerprint reader 5, a camera 3, a check and license imaging device 8, a bill acceptor 9, keyboard 10, payment and scanning hardware 8, 9 and a vending mechanism 11. In addition, a data storage device 19 stores programs for the computer 12 as well as sales data and accounts. The vending mechanism 11 can be adapted to be reloaded and/or replenished without opening it. In this manner, the machine can be serviced from the outside. The kiosk of FIG. 3 can also optionally contain an ATM machine.

Figure 4:
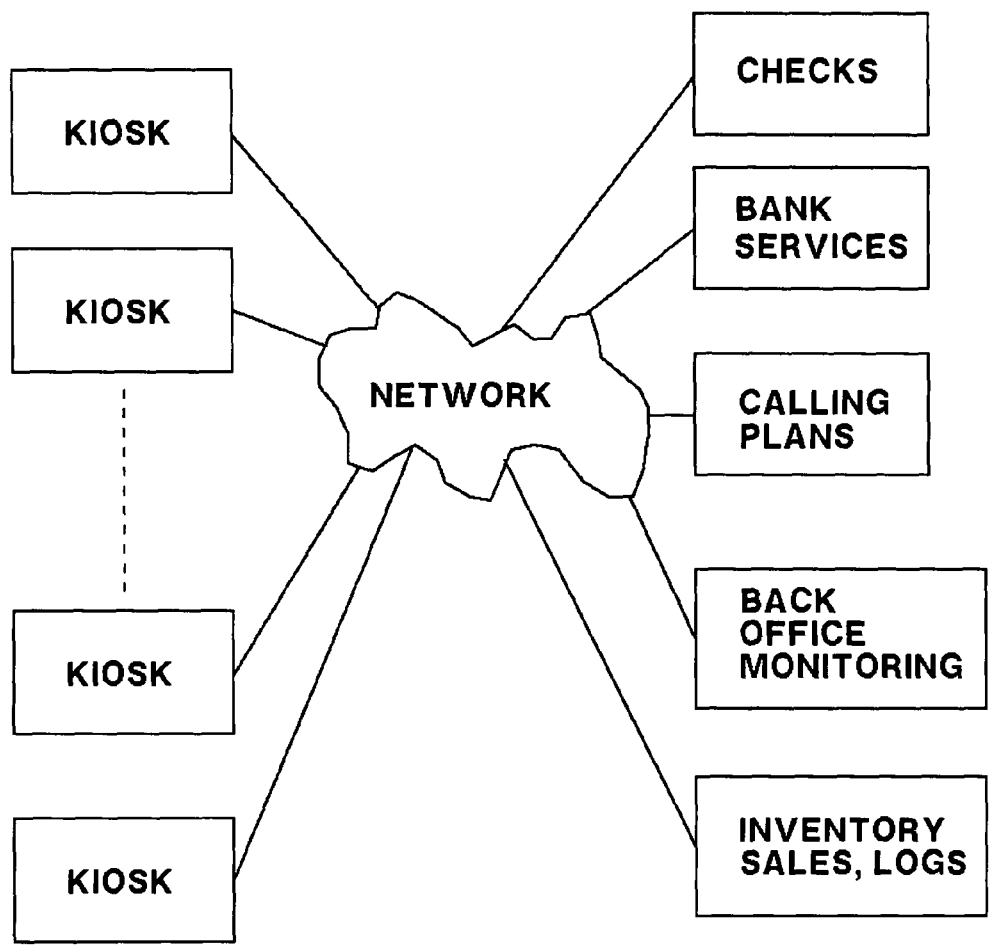
FIG. 4 shows a system of kiosks of the present invention in communication with management and support functions using the internet.

FIG. 4 shows a diagram of several of the kiosks or vending machines communicating wirelessly into the internet where they send and receive data to and from different locations depending on need. Communication can optionally take place with a check verification service, a bank service provider and a telephone plan provider (for non-prepaid plans). In addition, it is very desirable to manage a fleet of kiosks from a central location from a central back office. This office can keep track of sales as well as update an inventory log or database so that a technician can know for example when a particular kiosk needs servicing or is running out of a particular vended item. The entire communication shown in FIG. 4 can take place wirelessly; however, the most efficient and preferred way is to have the communication take place wirelessly only as far as an internet access point where further secure communication can continue using known techniques. Another preferred communications method is a direct, secure cellular telephone call. Generally all communication to and from the kiosk should be accomplished securely using cryptographic techniques and secure protocols known in the art. Each kiosk can also optionally have back-up wired land line telephone service. Communications can be with numerous providers application program interface (API) so that communication and services can be obtained according to the supplier's preferred protocol or format. A central station can optionally send advertisements to a number of different connected locations. Different locations could be sent the same or different advertisements for display.

Figure 5A:
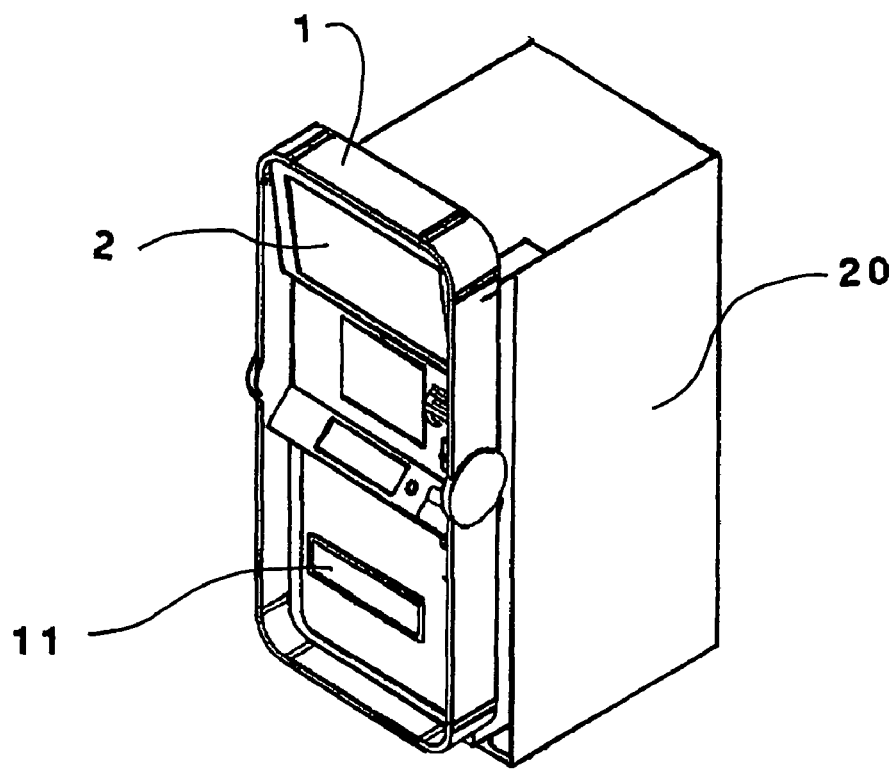
FIG. 5A shows a perspective view that illustrates a presentation format method.
Figure 5B:
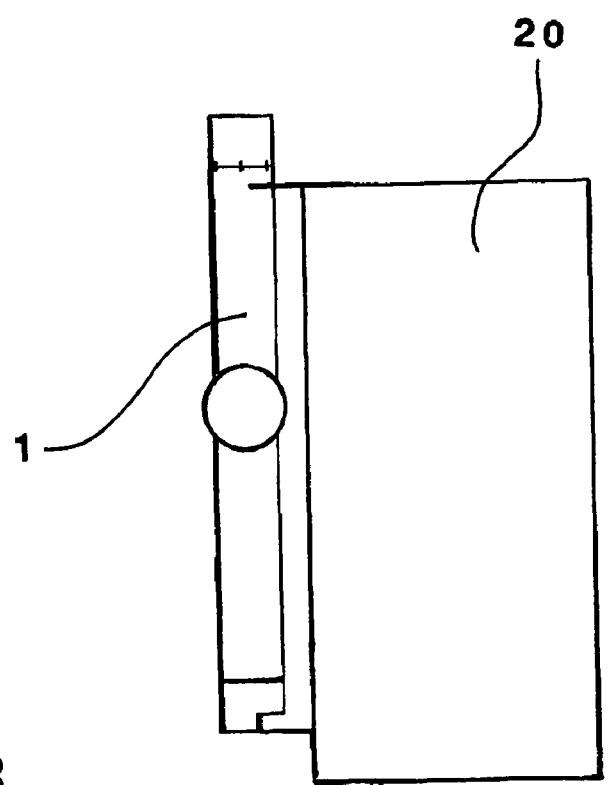
FIG. 5B shows the method of FIG. 5A from a side view.

FIGS. 5A-5B show a perspective and side view of a method of presenting formats. The kiosk can have main body 20 which contains all of the internal parts and a removable face 1 represents a changeable format. Different faces 1 can be placed on the body 20 for different locations or vending situations. FIGS. 5A-5B also shows a vending slot 11 and an advertisement screen 2.

Several descriptions and illustrations have been provided to aid in understanding the present invention. One of skill in the art will realize that numerous changes and variations are possible without departing from the spirit of the invention. Each of these changes and variations is within the scope of the present invention.

I claim:

1. An automated retail vending device comprising, in combination:
    a vending port adapted to vend and/or replenish functioning cellular handsets;
    a touch screen;
    a bill acceptor;
    a card reader;
    a camera;
    a computer running computer software electrically coupled to said vending port, said touch screen, said bill acceptor, said camera and said card reader;
    wherein said software guides a user through purchase of a prepaid cellular handset from said vending port using said touch screen and said bill acceptor or said card reader for payment, and said camera provides a photograph of said user;
    wherein said device also vends prepaid E-PINS and prepaid debit cards;

and wherein said device has changeable presentation formats.

2. The automated retail vending device of claim 1 further comprising wireless communication with a remote location.

3. The automated retail vending device of claim 1 further adapted to replenish said vending port with out opening vending port.

4. The automated retail vending device of claim 1 further comprising a fingerprint reader operationally coupled to said computer.

5. The automated retail vending device of claim 1 wherein said vending device receives advertisements from a remote location for display.

6. The automated retail vending device of claim 1 wherein said changeable presentation format is shaped like a cellular telephone.

7. An automated retail vending kiosk comprising, in combination:
- a vending port adapted to vend and/or replenish functioning cellular handsets;
- a touch screen;
- a bill acceptor;
- a card reader;
- a camera;
- a wireless communication port;
- a computer running computer software electrically coupled to said vending port, said touch screen, said bill acceptor, said wireless communication port, said camera and said card reader;
- wherein said vending port is adapted to replenish said vending port with out being opened;
- wherein said software guides a user through purchase of a prepaid cellular handset from said vending port using said touch screen and said bill acceptor or said card reader for payment, and said camera provides a photograph of said user ;
- wherein said kiosk also vends prepaid E-PINS and prepaid debit cards;
- and wherein said kiosk has changeable presentation formats;
- and wherein said kiosk communicates via said wireless communication port with a remote location.

8. The automated retail vending device of claim 7 further comprising a fingerprint reader operationally coupled to said computer.

9. The automated retail vending device of claim 7 wherein said kiosk receives advertisements from a remote location for display.

10. The automated retail vending device of claim 7 wherein said changeable presentation format is shaped like a cellular telephone.

* * * * *